W. W. & J. C. DORSEY.
INTERCEPTING CHUTE.
APPLICATION FILED DEC. 9, 1909.
976,852.
Patented Nov. 29, 1910.
2 SHEETS—SHEET 1.
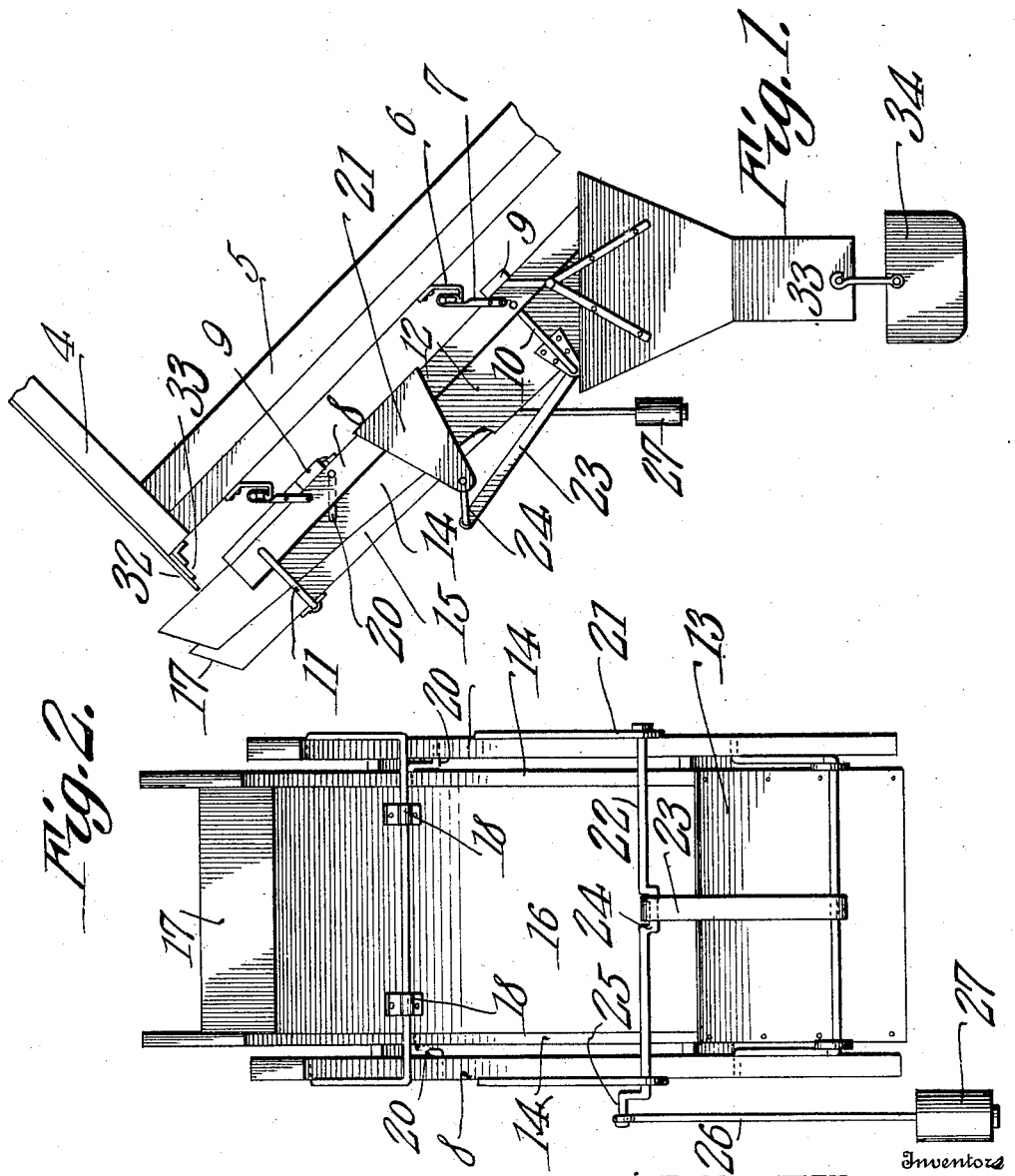

W. W. & J. C. DORSEY.
INTERCEPTING CHUTE.
APPLICATION FILED DEC. 9, 1909.
976,852.
Patented Nov. 29, 1910.
2 SHEETS—SHEET 2.
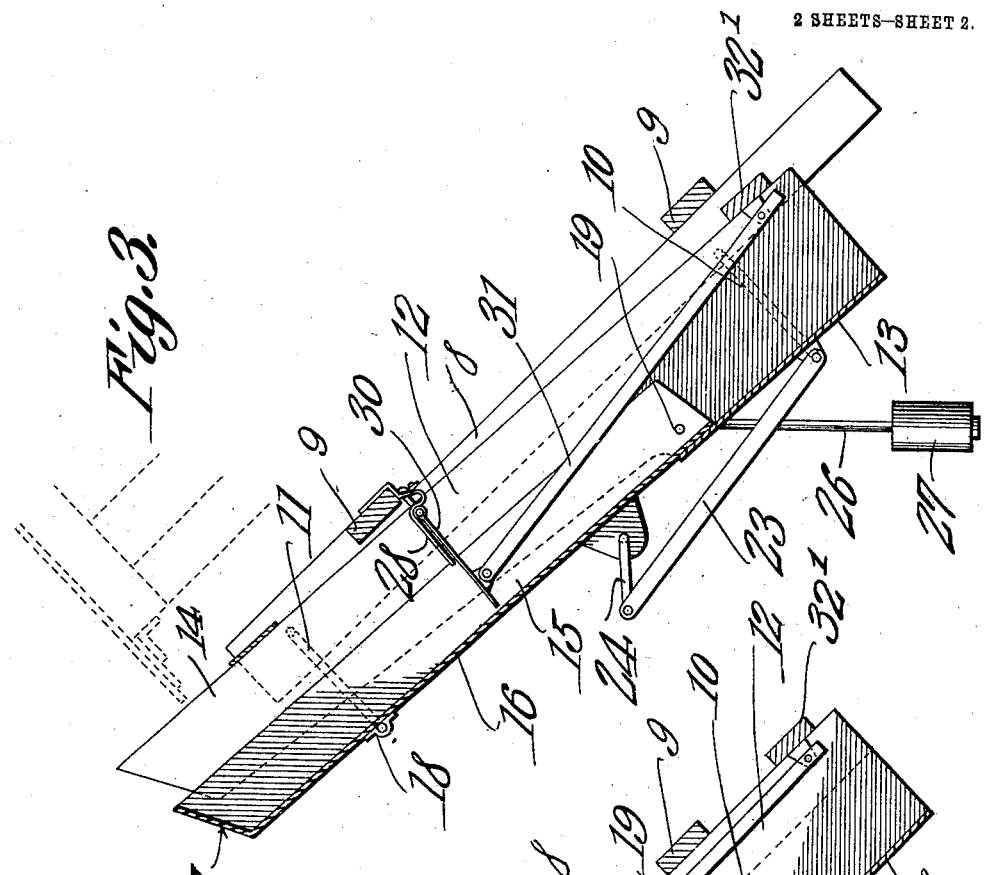
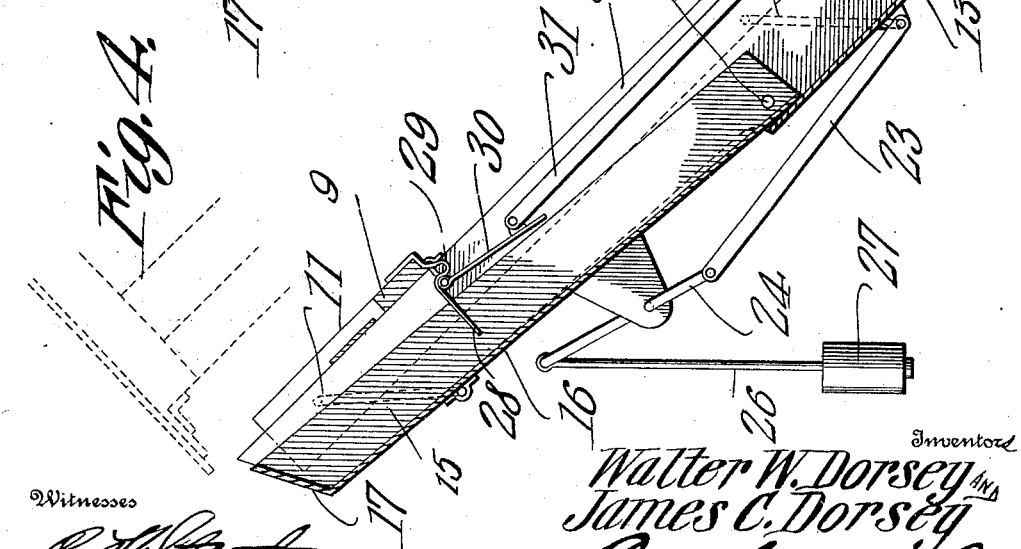
Witnesses
Inventors
Walter W. Dorsey and
James C. Dorsey
By C. A. Snow & Co.
Attorneys

UNITED STATES PATENT OFFICE.

WALTER W. DORSEY AND JAMES C. DORSEY, OF LAS ANIMAS, COLORADO, ASSIGNORS OF ONE-FOURTH TO RAYMOND BAUBLITS AND ONE-FOURTH TO MARTIN F. LOUB, OF LAS ANIMAS, COLORADO.

INTERCEPTING-CHUTE.

976,852.      Specification of Letters Patent.      Patented Nov. 29, 1910.

Application filed December 9, 1909. Serial No. 532,278.

*To all whom it may concern:*

Be it known that we, WALTER W. DORSEY and JAMES C. DORSEY, citizens of the United States, residing at Las Animas, in the county of Bent, State of Colorado, have invented a new and useful Intercepting-Chute, of which the following is a specification.

This invention relates to intercepting chutes used in taking a sample from any portion of a load of beets, potatoes or similar vegetables while the same is being unloaded into a freight car for shipment and contemplates to provide an intercepting chute which will automatically intercept a predetermined quantity of vegetables from any desired portion of the load while the same is in transit over the delivery screen to the freight car; to provide an intercepting chute which will automatically rock back from operative position after the sample is taken from the load so as to permit the discharge of the vegetables over the delivery screen to continue uninterrupted; to provide an intercepting chute which will not afford lodgment for earth scraped from the vegetables during their transit over the screen.

In the shipment of beets, a certain amount of weight must be detracted from the total weight of the load to account for earth clinging to the beets. A dirt apron is usually reversely inclined from the discharge end of the delivery screen to collect the earth gravitating from the screen but, as is well known, the greater portion of the earth caked upon the beets rides with them into the car. It is to determine the amount of this earth that my present invention is devised and employs for the purpose an extensible chute suspended by hangers from a track secured to the under side of the dirt apron and adapted to travel transversely on the apron to take the predetermined amount of beets from any particular portion of the screen and trip the same into the measuring receptacle.

The preferred form of our invention is illustrated in the accompanying drawings, in which—

Figure 1 is a side elevation of our intercepting chute in operative position. Fig. 2 is an enlarged view in elevation of the reverse side of the intercepting chute. Fig. 3 is a longitudinal sectional view of our improved chute showing the same in closed position. Fig. 4 is a longitudinal sectional view through our improved chute showing the same in open position.

Referring to the parts by their reference characters, 4 designates the beet screen and 5 the dirt apron. Secured transversely the bottom face of the dirt apron is a pair of tracks 6 upon which travel the hangers 7 that support the intercepting chute. The intercepting chute consists of a supporting frame comprising side bars 8 connected together adjacent each end by cross braces 9. Journaled in the side bars 8 are the extremities of a pair of U-shaped rocker frames 10 and 11 which support upon their intermediate portions a sectional chute. The lower section of the sectional chute comprises side walls 12 and a bottom wall 13 which connects the side walls adjacent the delivery end of the chute. The side walls are extended in their planes to form arms 14 remote from the delivery end of the section to receive the upper section. The upper section of the sectional chute comprises side walls 15, a bottom wall 16, and an inclined end wall 17. Eyes 18 pivotally secure the rocker frame 11 to the bottom wall of the upper section. The side walls of the upper section slidingly fit the arms of the lower section and are pivotally connected thereto by pivot bolts or like connectors 19. The upper section is thus pivoted at one end to the lower section and may be rocked out between the arms 14 of the latter, this pivotal movement being limited by the rocker frame 11.

A pair of rocker links 20 connect the free ends of the arms 14 of the lower section with the side bars 8 of the supporting frame. The links are less in length than the wings of the rocker frame 11 and as the chute is rocked the arc described by the rocker frame is greater than that described by the links so that the upper section is expanded from the arms 14 as the chute is rocked upward and retracted as the chute is rocked to its normal position. A greater intake throat is thus presented to the beets advancing down the beet screen than is obtainable with an ordinary chute. Secured to the side bars 8 of the supporting frame are hangers 21, the extremities of which project beyond the bottom of the sectional chute and are provided with suitable bearings to receive a crank shaft 22. A link 23 is pivotally connected at one end to the cross bar of the rocker frame 11 and is provided at its opposite extremity with a suitable bearing to receive the crank 24 of the crank shaft. Formed integral with one extremity of the crank shaft is a crank 25 upon the extremity of which is swiveled a link 26 that carries on its free extremity a weight 27. The weight 27 is sufficient to counterbalance the weight of the sectional chute and normally holds the latter in operative or expanded position, as best seen in Fig. 1.

Projecting downwardly from the cross brace 9 is a leaf 28 which extends nearly to the bottom walls 16 of the upper section and defines a compartment adjacent the intake end of the latter. The leaf 28 extends entirely across the sectional chute and is provided adjacent its secured end with a looped portion 29. A trap door 30 is pivotally secured at one end to the side walls of the supporting frame and operates when in closed position to form a closed receptacle in the intake end of the upper section. The hinged end of the trap door 30 bears against the opposed face of the loop 29 throughout its entire length, the particular advantage of this construction being that the hinge is held against any tendency to buckle during severe service. A link 31 is pivotally connected at one end to a cross brace 32 carried by the lower section and is pivotally connected at its opposite end to the free extremity of the trap door. The link 31 being secured at one end to the transverse brace 32' of the lower section will be carried with the latter in its movement and will operate to swing the trap door into closed or open position as the chute is rocked to operative or released position.

In order to prevent earth from gravitating from the free end 32 of the screen into the intercepting chute, a plate 33 is secured to the bottom face of the screen, as shown. When in released position the inclined end face 17 of the upper section is so positioned relatively to the discharge end of the beet screen that earth gravitating therefrom will strike the said inclined face and be directed outwardly from the chute.

In operation the chute is advanced along the track 7 with the parts positioned as shown in Fig. 4 until the portion of the beet screen has been reached from which it is desired to take a simple measure of beets, the weight 27 being meanwhile held from gravitating because the walls 12 bear upwardly against the cross braces 9. The weight 27 is now pushed upwardly to swing the crank 25 past the dead center and is allowed to gravitate and will operate through the medium of the crank shaft 22, link 23 and rocker frame 11 to advance the intake throat of the sectional chute above the delivery end of the beet screen. The sectional chute is expanded by this movement, and registers with the discharge end of the beet screen so that the beets will be directed into the compartment above the trap door. The trap door is carried to its closed position as the chute is rocked upward by the gravitating weight and receives the beets from the beet screen. as the beets accumulate upon the trap door the counter-balancing function of the weight is gradually overcome until finally the total weight of the accumulated beets overbalances the weight 27 and the trap door is sprung. The weight may now be caught and held from gravitating so that the beets contained in the chute may be discharged. A hopper 33' is secured to the discharge end of the chute and a measuring basket or other container 34 is detachably secured to the spout of the hopper to receive the beets therefrom. The beets contained in the measuring basket may now be freed from the earth caked upon them and this earth measured to obtain the weight of earth clinging to the measured quantity of beets. A number of samples may be taken from different portions of the load of beets being discharged over the delivery screen and from the total weight of the earth removed from the entire measured quantity of beets a basis for calculation is obtained from which the total amount of earth contained in the loaded car may be estimated.

From the foregoing description, taken in connection with the accompanying drawing, it is thought that the construction and operation of our invention will be easily understood without a more extended explanation, it being understood that various changes may be made in the form, proportion and minor details of construction without sacrificing any of the advantages or departing from the spirit of the invention.

What is claimed is:

1. An extensible chute having an outer section, the side walls of which are extended in their planes to form oppositely disposed arms, an inner section pivotally connected at one end to said arms adapted to be rocked therebetween, a supporting frame having spaced side bars extending longitudinally of said outer section, rocker frames pivotally connecting each of said sections to the side bars of said supporting frame, and a link connecting one of said arms with the side bar of said supporting frame and coöperating with the inner section rocker frame to expand and retract said inner section.

2. An extensible chute having an outer section, the side walls of which are extended in their planes to form oppositely disposed arms, an inner section pivotally connected at one end to said arms and adapted to be rocked between the free ends thereof, a supporting frame having spaced side bars extending longitudinally of said outer section, rocker frames pivotally connecting each of said sections to the side bars of said supporting frame, hangers carried by said side bars and extending beyond the bottom walls of said sections, a crank shaft journaled in the extremities of said hangers, a link pivotally connected at one extremity to said outer section and at the other extremity to the crank of said crank shaft, and a counterbalancing weight connected to the extremity of said shaft adapted to rotate the same whereby to advance said sections longitudinally of said supporting frame.

3. An extensible chute having an outer section, the side walls of which are extended in their planes to form oppositely disposed arms, an inner section pivotally connected at one end to the arms of said outer section and adapted to be rocked therebetween, a supporting frame, the side walls of which extend longitudinally of said sections, rocker frames pivotally connecting each of said sections with said side bars, a trap door pivotally connected at one end to said side bars and adapted when closed to extend to the bottom wall of said inner section and form a receptacle in the intake end of said section, a link pivotally connected at one end to the free end of said trap door and at the other end pivotally connected to said outer section, and a counterbalancing weight carried by said outer section adapted to simultaneously advance said outer section longitudinally of said frame to close said trap door.

4. An extensible chute having an outer section, the side walls of which are extended in their planes to form oppositely disposed arms, an inner section pivotally connected at one end to the arms of said outer section and adapted to be rocked therebetween, a supporting frame, the side walls of which extend longitudinally of said sections, rocker frames pivotally connecting each of said sections with said side bars, a crank shaft carried by said supporting frame and spaced from the bottom walls of said sections, a link connected at one extremity to the crank of said crank shaft and at the other extremity to the outer section, a counterbalancing weight assembled with said crank shaft and operating to rotate the same and advance said sections longitudinally of said supporting frame, and a link connecting said supporting frame and outer section and coöperating with the inner section rocker frame to expand the sections simultaneously with their advancing movement.

5. An extensible chute having an outer section, the side walls of which are extended in their planes to form oppositely disposed arms, an inner section pivotally connected at one end to said arm and adapted to be rocked between the free ends thereof, a supporting frame having spaced side bars extending longitudinally of said outer section, rocker frames pivotally connecting each of said sections to the side bars of said supporting frame, a link connecting a side bar of the supporting frame with an arm of the outer section, said link being less in length than the side bars of the upper section rocker frame whereby to cause the free extremities of said arm to rock in an arc of less radius than the free end of said inner section, a trap door pivotally mounted on said supporting frame and adapted when closed to form a receptacle in the intake end of said inner section, a link connecting the free end of said trap door to said outer section, a crank shaft carried by said supporting frame and extending transversely the bottom walls of said sections, a link connected at the end to the crank of said crank shaft and at the other end to said outer section, a counterbalancing weight adapted to rotate said crank shaft whereby to simultaneously advance the sections longitudinally of said supporting frame, expand the free ends of the sections and close the trap door.

In testimony that we claim the foregoing as our own, we have hereto affixed our signatures in the presence of two witnesses.

WALTER W. DORSEY.
JAMES C. DORSEY.

Witnesses:
A. W. BURKS,
R. J. CAMPBELL.